United States Patent [19]
Watrous

[11] 4,030,013
[45] June 14, 1977

[54] EMERGENCY LIGHTING SYSTEM AC LINE VOLTAGE SENSING

[75] Inventor: Donald L. Watrous, Liverpool, N.Y.

[73] Assignee: General Electric Company, Carmel, Ind.

[22] Filed: Aug. 25, 1975

[21] Appl. No.: 607,487

Related U.S. Application Data

[62] Division of Ser. No. 534,660, Dec. 19, 1974, Pat. No. 3,921,005.

[52] U.S. Cl. .................................. 320/59; 315/86
[51] Int. Cl.² .......................................... H05B 37/04
[58] Field of Search ............... 315/86; 307/11, 17, 307/64, 66; 320/2, 59; 321/8, 16; 324/119; 240/37.1

[56] References Cited
UNITED STATES PATENTS

| | | | |
|---|---|---|---|
| 2,650,339 | 8/1953 | Christie et al. | 320/48 |
| 3,659,179 | 4/1972 | Barker et al. | 320/2 |
| 3,790,810 | 2/1974 | Rogers et al. | 307/66 |
| 3,836,815 | 9/1974 | Herzog | 307/66 |
| 3,868,562 | 2/1975 | Marshall | 321/18 |
| 3,875,421 | 4/1975 | Anshus | 307/66 |
| 3,900,783 | 8/1975 | Herzog et al. | 307/66 |

FOREIGN PATENTS OR APPLICATIONS

| | | | |
|---|---|---|---|
| 724,224 | 12/1930 | France | 324/119 |

*Primary Examiner*—William H. Beha, Jr.

[57] ABSTRACT

An emergency lighting system includes a high reactance transformer with a primary winding for connection to AC line voltage and a secondary winding. Circuit means are provided for monitoring the AC line voltage and includes means for coupling the transformer secondary winding to a non-linear load, a battery, during one AC half cycle and means for coupling the secondary winding to a linear load during an alternate AC half cycle to provide a DC voltage proportional to the AC line voltage.

4 Claims, 3 Drawing Figures

EMERGENCY LIGHTING SYSTEM AC LINE VOLTAGE SENSING

This is a division of application Ser. No. 534,660, filed Dec. 19, 1974, now U.S. Pat. No. 3,921,005.

BACKGROUND OF THE INVENTION

1. Field of the Invention

The present invention relates to a high efficiency inverter circuit capable of delivering sinusoidal voltage at high frequency, and particularly to an emergency lighting system including a tuned inverter for operating at least one gaseous discharge lamp.

2. Description of the Prior Art

Electric power failures due to inclement weather conditions and equipment breakdowns have been a plague for many years. Recently, widespread areas have suffered blackouts due to overloading of the generating or transmission equipment. A power failure, no matter what may be the cause, may very well jeopardize human life and therefore there are many installations which require some type of emergency lighting system that will automatically come into operation upon the occurrence of a power failure. The high efficiency of a fluorescent lamp makes it especially valuable for use in an emergency lighting system.

Many of the emergency lighting systems available on the market utilize a rechargeable battery as the source of power for the system. Since there is a finite limit on the length of time that a battery can power an illumination system, it is rather important that the system have a high efficiency. Presently available systems are generally of the type using a transistor inverter. In a typical arrangement, a single lamp or group of lamps is used for both the normal AC operation of the lighting system and for the emergency system, using a battery as the power source for energizing the transistor inverter when the AC line voltage fails. A principle limitation of such inverter systems is relatively low efficiency. This low efficiency requires the use of a larger and hence more expensive battery to achieve acceptable operating time during emergency conditions.

Prior art circuits for sensing AC line voltage in emergency lighting systems are varied. One such system has a full wave responding inhibit voltage developed from a separate winding than that used to charge the battery, the inhibit winding being more tightly coupled to the primary than is the battery charge winding. With such an arrangement, the influence of variable battery voltage is attenuated. Another system appears to use a low reactance transformer with a dropping resistor to regulate the charging current to the battery, the resistor thus preventing the battery from clamping the transformer winding and influencing the AC inhibit voltage.

It is desirable therefore to provide an emergency lighting system capable of maximizing the operating time on a given battery charge.

In accordance with the present invention, there is provided, in an emergency lighting system having a high reactance transformer with a secondary winding and a primary winding adapted for coupling to an AC energy source, circuit means for monitoring the AC source voltage. Included are means for coupling the secondary winding of the transformer with a non-linear load during one half cycle of the AC source voltage and means for coupling the transformer secondary winding with a linear load during an alternate half cycle to provide DC voltage proportional to the AC source voltage.

DESCRIPTION OF THE PREFERRED EMBODIMENT

Figure 1:
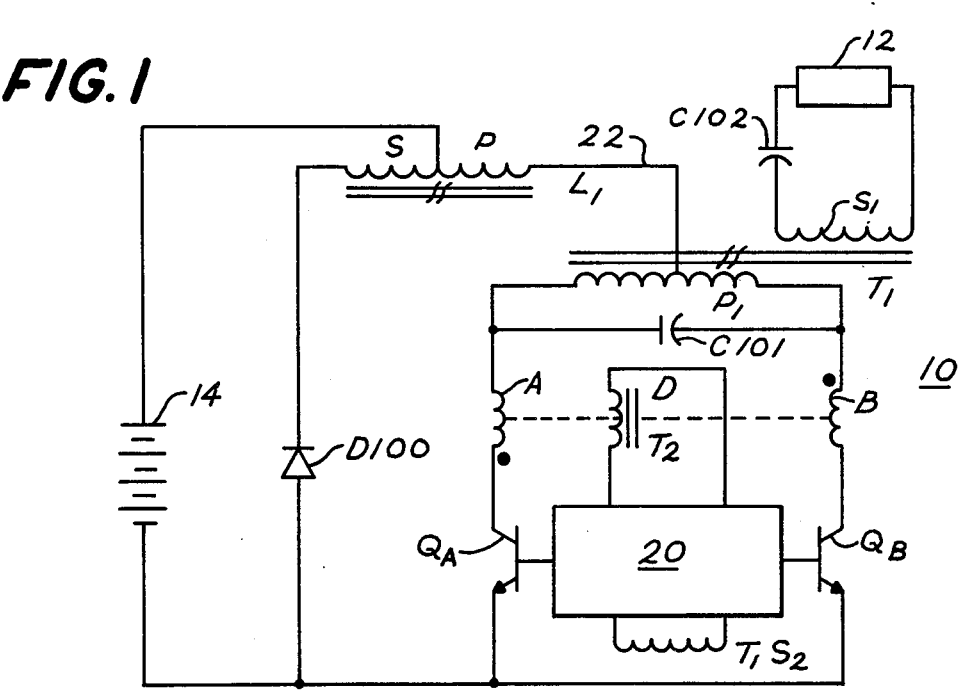
FIG. 1 is a basic schematic representation of the apparatus, including the high efficiency inverter, of the present invention.

In accordance with the present invention and referring now to FIG. 1, there is shown a tuned inverter 10 for energizing a load such as gaseous discharge lamp 12. A pair of transistors, $Q_A$ and $Q_B$ capable of operation in a low loss switching mode, are provided. An auxiliary electrical energy source, such as battery 14, provides the power necessary to operate the inverter. Means enabling the transistors to operate in the low loss switching mode are provided, such as inductor L1P, a buffer inductance, coupled serially with battery 14. A first transformer T1 serves to couple the inverter 10 with the lamp 12 and is resonated with capacitances C101 and C102 to set the operating frequency of the inverter and to establish a sinusoidal output voltage. Inductor L1P then is electrically connected with a center tap of a primary winding P1 on transformer T1.

A control circuit 20 is provided for supplying base drive for switching transistors $Q_A$ and $Q_B$ at zero collector voltage: That is, when the instantaneous voltage across capacitor C101 is zero. Thus, as the primary voltage across transformer T1 varies at fundamental frequency, the voltage at point 22 and hence across conductor L1P varies at twice the fundamental frequency. The current through L1P is DC with a second harmonic component. This same current is alternately carried by the two transistors $Q_A$ and $Q_B$. While the transistors are required to switch collector current, they do so at essentially zero collector voltage with a resultant low power dissipation.

During some transient conditions, both transistors $Q_A$ and $Q_B$ may switch off thereby arresting current flow in inductor L1P. Voltage clamping means are provided in the form of inductor secondary winding L1S and diode D100 such that the ensuing voltage transient at point 22 is limited, with the result that the stored energy is returned to the battery. It should be noted that inductor L1S and Diode D100 carry current only during transients and hence do not incur power loss during normal operation of the inverter.

Means providing timing information to the control circuit for effecting switching of the respective transistors in step with a natural resonant frequency of the inverter is provided and takes the form of an auxiliary winding T1S2 magnetically coupled with the primary winding T1 of first transformer T1. Thus the control circuit tracks the resonant frequency of first transformer T1 and ensures that transistor switching occurs when the voltage across capacitor C101 is zero. Winding T1S2 is not used as the source of energy for driving the transistors $Q_A$ and $Q_B$ because of its sinusoidal wave form.

Higher efficiency can be achieved in inverter 10 by making the base drive of the transistors proportional to the collector current thereof. To this end there is included means providing a feedback current to the control circuit to effect transistor base drive proportional to transistor collector current, which in the preferred embodiment takes the form of a feedback transformer T2 having a feedback winding D magnetically coupled to the respective collectors of the transistors $Q_A$ and $Q_B$ through a pair of windings A and B respectively. Thus, the power consumed by the control circuit 20 can be limited to that required to start and control the oscillation of the inverter 10.

Figure 2:
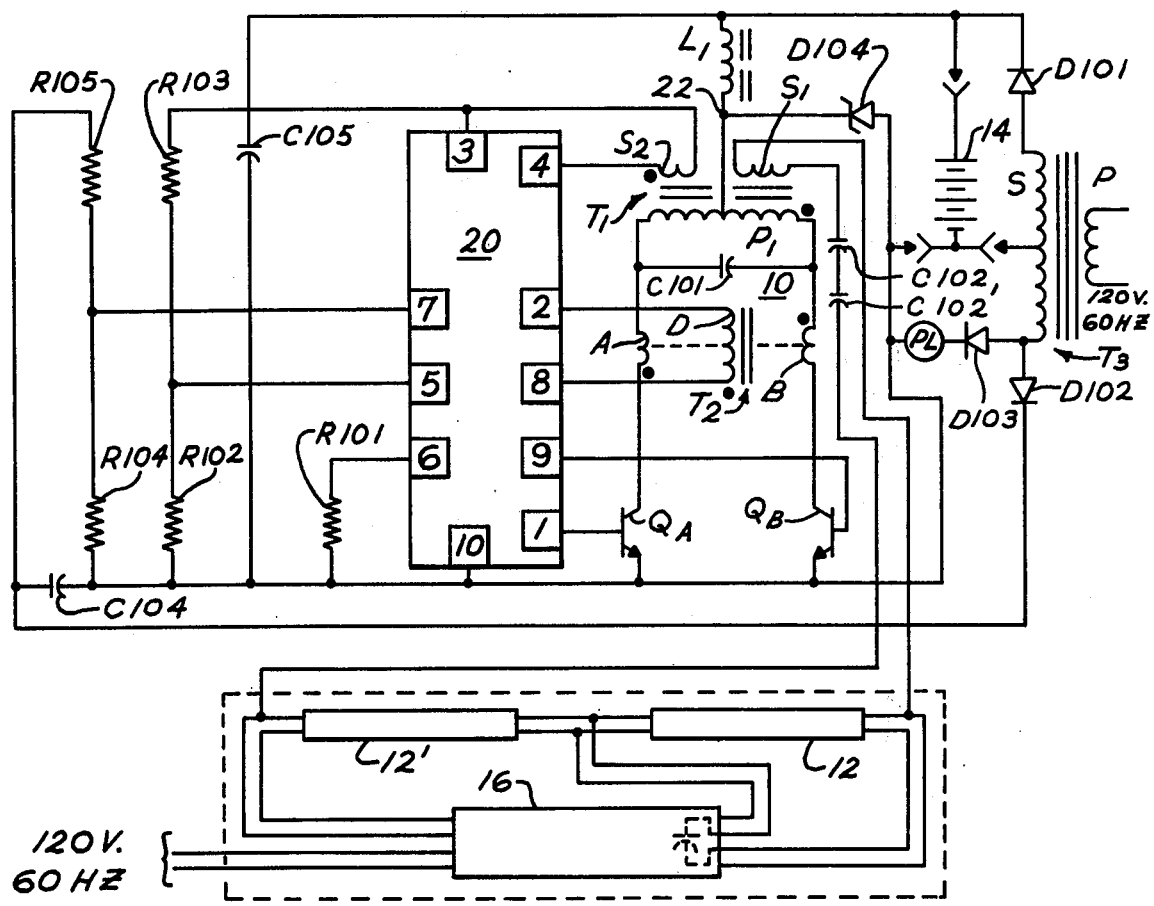
FIG. 2 is a schematic representation of the preferred embodiment of the emergency lighting apparatus, incorporating the high efficiency inverter, of the present invention.

Referring now to FIG. 2, the basic inverter circuit of FIG. 1 has been expanded to provide an emergency lighting system circuit which will automatically become operative upon the failure of the primary electric source. Coupling of the lamps 12, 12' to an AC source through a ballast 16 is shown in the conventional way for operation during normal conditions when the AC source voltage is above a predetermined value. The system includes means such as second transformer T3 for coupling to a first electrical energy source such as a typical 120 volt, 60 Hz AC source. Means are provided for charging battery 14, this being accomplished through impedance limited transformer T3, thence through diode D101.

The operation of the system circuit of FIG. 2 will now be discussed with reference being made generally to the control circuit 20 shown in block form. A thorough discussion will be given hereinafter of the operation of control circuit 20 by referencing to FIG. 3. It should be noted however at this point that control circuit 20 includes a first sensor for sensing the voltage of the AC source and a second sensor for sensing the voltage of the battery. Control circuit 20 also includes logic means combining the outputs of the first sensor and the second sensor to enable inverter 10 when the battery voltage is above a predetermined level and the AC voltage is below a predetermined level and to disable the inverter when the battery voltage is below a predetermined level or the AC voltage is above a predetermined level.

Assuming now that the inverter is enabled to run, control circuit 20 supplies a small base drive signal to one of the transistors $Q_A$ and $Q_B$. Assuming that the small base drive is applied to $Q_A$, $Q_A$ turns on and current starts to flow through L1, the center tap of the primary P1 of transformer T1, thence through P1 and through the A winding of feedback transformer T2, to transistor $Q_A$ and thence back to the battery. The base drive originally supplied on transistor $Q_A$ is augmented by a current flow from winding D of feedback transformer T2 to the control circuit 20 to exit from pin 1 thereof thence to flow through the base of transistor $Q_A$. This base drive is proportional to the collector current of transistor $Q_A$ and is designed to be adequate to keep the transistor in saturation.

At some volt-second product, feedback transformer T2 saturates sharply, suddenly reducing the output current of winding D thereof, thereby reducing the base drive to transistor $Q_A$. A sudden rise in collector-emitter voltage on transistor $Q_A$ sharply reduces the rate of current rise in this DC circuit. This change in collector current with respect to time reverses the polarity of the S2 winding of transformer T1 and hence the polarity of the voltage on pins 3 and 4 of the control circuit 20. This reversal of polarity signals the control circuit to change the base drive from transistor $Q_A$ to transistor $Q_B$.

Control circuit 20 now applies a small amount of base drive through pin 9 to the base of transistor $Q_B$, and simultaneously connects the base of $Q_A$ to the emitter thereof to hasten the turn off process of transistor $Q_A$. Transistor $Q_B$ starts to conduct as a result of the small base signal from the control circuit and current flows through winding B of feedback transformer T2 to induce a current in winding D thereof and supplies this current to the control circuit 20. The control circuit now supplies this current as base drive out of pin 9 to the base of $Q_B$; thus the base drive of $Q_B$ is proportional to the collector current thereof such that the transistor is kept in saturation.

Transformer T1 has an air gap and operates as a nearly linear inductor. When the voltage across winding P1 of transformer T1, and thereby the voltage on winding S2 of that transformer, reaches zero, this event is signalled to the control circuit 20 through pins 3 and 4 thereof. The control circuit again switches the base drive circuitry to transistor $Q_A$ from $Q_B$ and connect the base of $Q_B$ to the emitter thereof to hasten the switching off of transistor $Q_B$. The circuit is then ready to go through the next half cycle with $Q_A$ conducting.

If switching could be accomplished in absolute zero time, the above described circuit operation would be entirely correct. However, normally the switching is accomplished in periods of less than one microsecond and the current flow from the battery 14 is essentially at a constant level with a small ripple content. This ripple content is determined by the inductance of L1 which adds or subtracts from the battery voltage as applied to the tap of the primary coil of transformer T1. It is this inductor L1 which adjusts the voltage at point 22 in such a way that the transistors may be switched at zero collector voltage. As long as this inductance L1 has a value exceeding a critical value, the circuit will function as described. In the event that both transistors are in the off state, the rate of current change in L1 forces the voltage thereacross to a value where zener diode D104 starts conducting to limit the voltage applied to the circuit. This clipping action rapidly reduces circuit efficiency and hence is an operational mode to be avoided. This clipping action can occur momentarily during the starting process or when the inverter is turned off and under these conditions represents an acceptable design operating condition.

The load for the inverter 10 (including lamps 12 and 12') is connected on a winding S1 of transformer T1. For fluorescent emergency lighting purposes, the ballasting is done by capacitors C102 and C102' which determine the load current through the lamps 12 and 12'. This capacitance in conjunction with C101 and inductance of T1P1 determine the operational frequency of the system. (The inductance of the P1 winding and capacitance of C101 determine the oscillating frequency when S1 is unloaded.) A double capacitive ballast system is used to reduce the voltage across a single unit and thus enhance the reliability of the complete system. The voltage output of the inverter circuit is high enough to instant start 40 watt rapid start lamps under fairly adverse conditions.

Circuit means are provided for monitoring the AC source voltage and include means for coupling the secondary winding S of high reactance transformer $T_3$ with a non-linear load during one half cycle of the AC source voltage, to supply charging current for battery 14. As stated above, battery charging is accomplished from center tapped winding S of 60 Hz transformer $T_3$. Half wave charging current is coupled to a non-linear load, the battery 14, through diode D101 and is limited in magnitude by the reactance of the transformer. Because of the transformer reactance, the sinusoidal voltage at the terminals of winding S is clamped at the battery voltage when diode D101 conducts. On the alternate half cycle, diode D103 conducts half wave current through indicator lamp PL and the dual prong battery plug. Thus, the battery must be plugged in and the 120 V AC power available to energize lamp PL indicating that the battery is charging. Using the alternate half cycle reduces the volt amp. rating of the transformer $T_3$. For monitoring the AC source voltage, means are provided for coupling secondary winding S of transformer $T_3$ with a linear load during an alternate half cycle. To this end, during the half cycle alternate from that in which the battery is charged, capacitor C104 is charged through diode D102. This DC monitoring voltage is connected to the first sensor means at terminal 7 of control circuit 20 through a linear load, resistor divider R104 and R105. The DC voltage at terminal 7 is proportional to the average value of the 60 Hz supply voltage and is not influenced by the aforesaid clamping action of the battery. Thus, transformer $T_3$ serves a dual purpose.

In the event that the battery 14 cannot accept charging current due to a defective cell or open connection, there exists the possibility that an abnormally high voltage from winding S on transformer $T_3$ would be applied directly across pins 3 and 10 of the control circuit 20. By taking advantage of the current limiting characteristics of the winding S of transformer $T_3$, zener diode D104 conducts so as to clip the peaks of this voltage wave at a safe value, thus to protect the control circuit. This mean that zener diode D104 must be sized so as to dissipate this expected energy.

Figure 3:
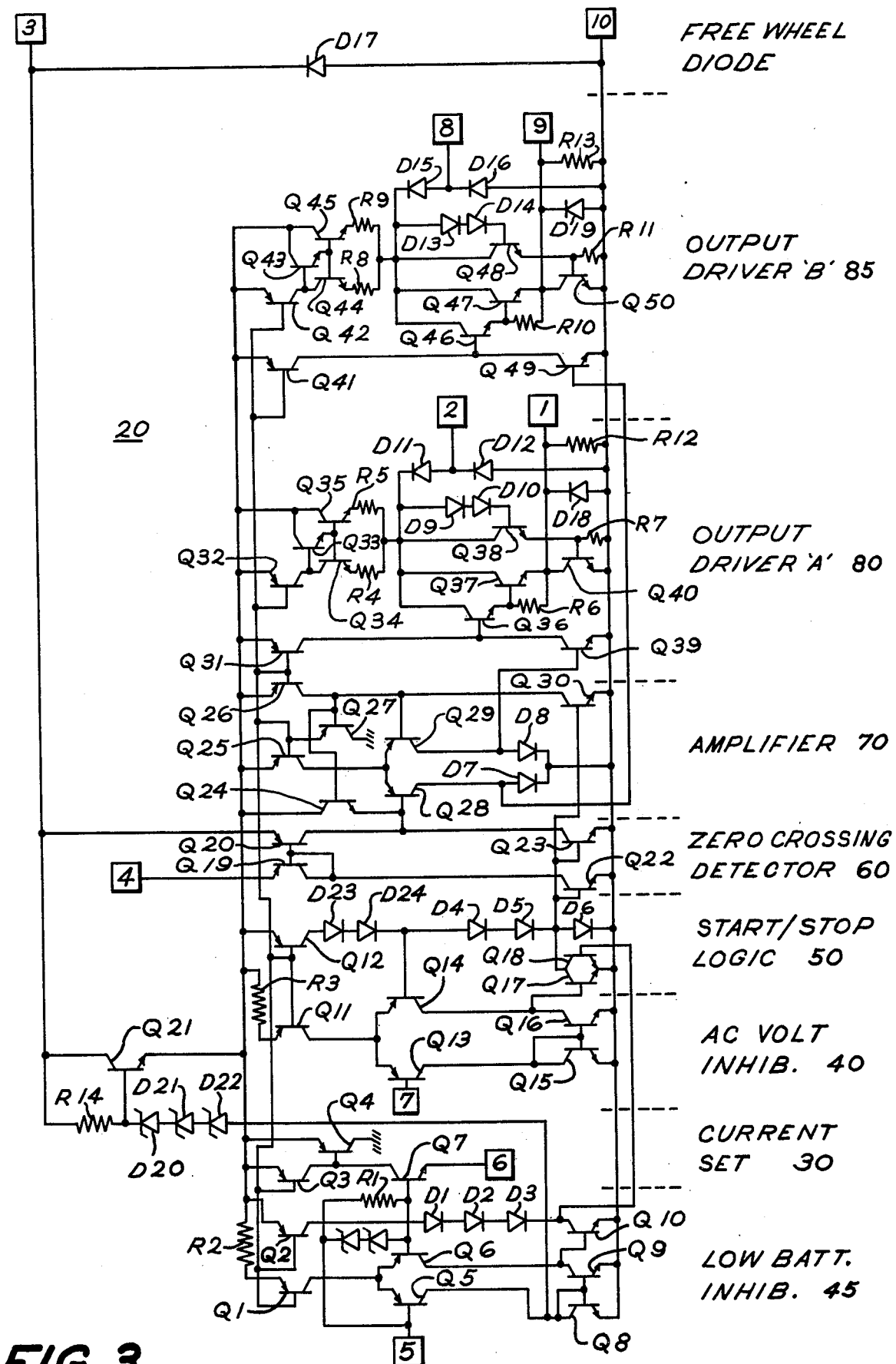
FIG. 3 is a detailed schematic representation of the preferred embodiment of the control circuit shown in block form in FIGS. 1 and 2.

Referring generally now to FIG. 2 and 3, an explanation will be given of the operation of control circuit 20 in conjunction with the inverter and the emergency lighting system.

A current set subcircuit 30 establishes the currents for the entire inverter control circuit. The master current for all current sources (Q1, Q2, Q3, Q11, Q12, Q22, Q23, Q25, Q30, Q31, Q32, Q41, Q42) is set at 100 microamps, at room temperature, by resistor R101 coupled to the pin 6 of the control circuit. The reference voltage for transistor Q7 consists of diodes D1, D2 and D3 plus saturated transistor Q10. The diode string is operated at approximately 100 microamps from current source Q2. Resistor R1 provides starting current to Q7 when terminal 5 is above about 0.7 volts and the battery voltage is above approximately 3 volts.

As stated above, the inverter must operate if the battery voltage is above the DC inhibit threshold and the AC line voltage is below the AC inhibit threshold. Furthermore, if the battery voltage is below the DC inhibit threshold or the AC line voltage is above the AC inhibit threshold, the inverter must not operate. To this end, the control circuit includes a first sensor in the form of an AC voltage inhibit subcircuit 40 consisting of a differential amplifier Q13 and Q14, and a current minor load Q15 and Q16. Winding S of transformer T3 supplies a half-wave rectified signal over a diode D102 to filter capacitor C104 and voltage divider network R104 and R105 to apply a signal to pin 7 of the control circuit. As this half-wave rectified voltage decreases with decreasing line voltage, it finally reaches a point where the AC inhibit circuit switches. This would be the inverter turn on point. Because of the nature of the half-wave rectified signal, a hysteresis is necessary in the AC inhibit circuit operation. Thus, the inverter turn-off point as controlled by the AC line will be higher than the inverter turn-on point. By adjusting the ratios of R104 and R105, either the inverter turn-on or turn-off point may be controlled over quite a wide range; however, both inverter turn-on and turn-off points may not be separately controlled because of the relatively fixed value of the hysteresis built in.

As stated, the AC voltage is rectified and filtered thence to flow through resistor divider R104 and R105 connected to input terminals 7. For high AC voltage, Q13 is cut off and Q17 conducts, establishing the reference at two diode drops (D4, D5 + VSAT (Q17). At low AC voltage, Q17 is cut off and the reference voltage is raised regeneratively, by the voltage drop across diode D6. The magnitude of hysteresis is one diode D6 in series with D4 and D5. The swing between high and low voltage trip points on terminal 7 is designed to consist of approximately 50% ripple voltage and 50% change in AC voltage level. The relatively high tolerance to ripple voltage permits a smaller capacitor C104.

The DC battery voltage or charging transformer winding voltage is applied between pins 3 and 10 of the control circuit. This same voltage is applied across voltage divider R102 and R103 to pin 5 of the same control circuit. When the voltage at pin 5 drops below a value determined by the construction of the control circuit and in particular, a second sensor in the form of low battery inhibit subcircuit 45, the control circuit stops driving transistor $Q_A$ and $Q_B$ thus shutting down the inverter. This voltage is normally set at approximately one half of the nominal battery voltage but it may be adjusted by the ratio of R102 and R103. Hysteresis is implemented in the control circuit in subcircuit 45. Hysteresis provides clean on/off switching of the inverter. Furthermore after the inverter switches off, the voltage rises causing the inverter to operate again. This repeated flashing of the fluorescent lamp indicates the battery is discharged — a useful feature for an emergency lighting system. The battery voltage is monitored by resistor divider R102-R103 connected to terminal 5. At low battery voltage, Q5 conducts, Q10 is cut off and Q18 conducts. The circuit regenerates and the magnitude of hysteresis is one diode ($V_{BE}$, Q18) in series with D1, D2, D3. The presence of the starting resistor R1 is minimal at trip since the differential amplifier is essentially balanced.

In the event that the battery 14 cannot accept charging current due to a defective cell or open connection, the voltage across pins 3 and 10 of the control circuit will rise to a point which is the peak of the AC wave generated in winding S of the 60 Hz transformer T3. This voltage could be excessive for the control circuit if certain design precautions are not taken. When the voltage across pins 3 and 10 of the control circuit exceeds about 27 volts, an internal regulator in the control circuit shuts down the function of this control in such a way as to minimize the voltage stress on the various components of the circuit.

Transistor Q22 is subjected to nearly the entire voltage across pins 3 and 10. In the event of an overvoltage fault, the zener diode string, D20, D21, D22, starts to conduct injecting current into transistor Q8 thus shorting the bases of Q22, Q23, Q30 to their emitters through transistors Q18, Q10, Q95 and Q8. This assures safe operation for Q22 up to a voltage across pins 3 and 10 equal to the collector to base breakdown voltage of Q22 rather than the much lower collector to emitter breakdown voltage.

In the overvoltage fault condition, the zener diodes D20, D21, D22 conduct current and thus limit the voltage at the base of transistor Q21 to approximately 27 volts. The emitter of Q21 will be at a voltage about one volt below its base or about 26 volts. It is this voltage that the remainder of the control circuit is subjected to under overvoltage conditions. The normal collector to emitter breakdown voltage for NPN transistors fabricated by conventional integrated circuit technology is about 30 volts. The addition of transistor Q21 and zener diodes D20, D21, D22 serve to increase the voltage withstand capability of the control circuit from about 30 to about 50 volts, the remainder of the voltage greater than 26 volts being applied across the collector to emitter of Q21. Thus, the reliability of the system is enhanced in that electrical stresses are better distributed in the control circuit. In the non-fault, normal battery voltage operating condition, the power dissipation associated with the added protective components (Q21, D20, D21, D22, R14) is equal to the circuit current into pin 3 times the one volt drop of R14 and Q21 base-emitter, thus preserving the high efficiency of the control circuit.

The voltage occurring during normal inverter operation across the transistors $Q_A$ and $Q_B$ is double the DC battery supply terminal voltage. When these transistors are off, the voltage is reduced to simply battery terminal voltage. If the voltage across terminals 3 and 10 rises above nominal battery voltage, due to a defective cell or open connection zener D104 starts to conduct and limits the voltage to less than 50 volts thereby protecting the control circuit. Current limiting will be accomplished by means of the inherent impedance of winding S of transformer T3. The voltage applied to the circuit is thus limited to a safe value under quite severe over-voltage conditions. In the event that the voltage continues to rise because of wrong voltage applied to the primary of T3 and no battery, the most probable mode of failure of zener diode D104 is to short and this then crowbars the DC supply voltage to the inverter.

As stated hereinbefore, logic means are provided in control circuit 20 to combine the output of the first sensor, the AC voltage inhibit subcircuit 40 and the second sensor, low battery inhibit subcircuit 45. This is in the form of a start-stop logic subcircuit 50 which includes a current source Q12 (nominal 100 microamps) which drives a current mirror diode D6. The voltage drop across this diode is the reference for all currents in the remainder of the circuit. Transistors Q17 or Q18 short out this diode in response to signals from the battery inhibit subcircuit 45 or the AC voltage inhibit subcircuit 40.

Control circuit 20 also includes a zero crossing detector subcircuit 60 which consists of a current mirror (Q19, Q20) driven from two 100 microamp current sources (Q22, Q23). The AC signal is injected into the emitter of Q19 from a low impedance feedback winding S2 of transformer T1. This winding must carry 100 microamps when terminal 4 is positive with respect to terminal 3. The detector is designed to switch with less than plus or minus five millivolts.

An amplifier subcircuit 70 in control circuit 20 converts a single ended input to differential output. A differential amplifier (Q28, Q29) drives current mirrors D7, Q49 and D8, Q39 approximately 180° out of phase. The reference for the differential amplifier is two diode drops (Q26, Q21) below the positive bus. Transistor Q24 clamps the input to the differential amplifier at one diode drop below the reference and prevents current source Q23 from saturating. Current source Q30 drives current sources Q25, Q26, Q31, Q32, Q41, Q42 which are referenced to the positive supply for output drivers A and B.

A pair of output driver subcircuits 80 and 85 in control circuit 20 provide the output drive for inverter transistors $Q_A$ and $Q_B$, respectively. The basic output driver subcircuit contains a 2 milliamp current source Q32, Q33, Q34, Q35, connected to output terminal 1 through a Darlington switch, Q36, Q37. When transistor Q36 is cut off, the collector voltage on the Darlington rises, diverting the 2 milliamp current through D9, D10, Q38 and the base of Q40. Transistor Q40 provides an active current sink on output terminal 1.

Once collector current starts in switching transistor $Q_A$, feedback current from current transformer T2 flows through terminal 2, D11, Q37, terminal 1, $Q_A$, D16 and terminal 8. This current is proportional to the collector current in $Q_A$ and is set by the turns ratio of T2 (typically 20:1) to hold $Q_A$ in saturation.

When the zero crossing detector subcircuit 60 switches, Q36 goes "off" and Q46 goes "on". The collector voltage of Darlington Q36, Q37 rises diverting feedback current through D9, D10, Q38 and base emitter of Q40. The conduction of Q40 reduces the turn-off time of $Q_A$. When the feedback current driving Q40 ceases, Q40 remains in soft conduction due to the aforesaid 2 ma base current and thereby provides a low resistance across the base emitter of $Q_A$. The automatic reduction of base current in Q40 conserves power and increases efficiency.

When Q46 is turned on, the 2 ma current from current source (Q43, Q43, Q45) is conducted through Q47 into switching transistor $Q_B$ causing it to be in soft conduction. When the collector current in $Q_A$ ceases, the feedback current reverses polarity, flowing through D15, Q47, terminal 9, $Q_B$, D12 and terminal 2, causing $Q_B$ to go into saturation. Base drive is now proportional to the collector current in $Q_B$.

When the zero crossing detector subcircuit 60 switches, Q36 goes "on" and Q46 goes "off". The turn-off of driver 85 and the turn-on of driver 80 repeats in the manner as previously described.

If $Q_A$ and $Q_B$ are off simultaneously during switching, voltage transients are produced. If $Q_A$ and $Q_B$ are on simultaneously, transient current will circulate between them. Over the normal range of operation, either condition may exist slightly.

Diodes D18 and D19, respectively, prevent excessive substrate current flow when respective output terminals 1 and 9 are driven negative. This condition exists if $Q_A$ and $Q_B$ are on simultaneously or under some inverter starting conditions.

Resistors R12 and R13, respectively, provide baseemitter resistance on respective switching transistors $Q_A$ and $Q_B$ to minimize collector leakage current when the inverter is not operating.

A free-wheel diode D17 provides a path for inductor L1 to discharge in the event the battery is disconnected while the inverter is operating.

The control circuit 20 may be fabricated as a single monolithic integrated circuit. In this form, the use of slaved current sources is particularly practical. In the embodiment described, the current consumption and hence power dissipation in control circuit 20, is essentially independent of battery voltage over the operating range. Furthermore, the control circuit can be matched to different power level inverters by scaling the currents in the control circuit. This is achieved by adjusting a single resistor R101. Thus, by adjustment of this resistor and modification of transformer T3, the control circuit would be applicable to a wide range of power levels while maintaining high efficiency.

The emergency lighting apparatus of FIG. 2, including the inverter of FIG. 1 and the control circuit of FIG. 3, has been constructed and has operated satisfactorily with components having the following values:

| | | |
|---|---|---|
| transistors $Q_A$, $Q_B$ | | GE D42C10 |
| transformer T1 | | primary winding R1 600 uH - 64 turns .0239" wire |
| | | load winding S1 - 1079 turns .0089" wire |
| | | feedback winding S2 - 7 turns .0089" wire |
| transformer T2 | | collector windings A & B - 8 turns .0126" |
| | | output winding D - 160 turns .0071" |
| transformer T3 | | primary winding P - 1600 turns |
| | | secondary winding S - 420 turns each side of center tap |
| inductor L1 | | 120 turns .0359" |
| lamps 12, 12' | | F40 T12 RS |
| battery 14 | | 18 VDC |
| resistor R101 | | 15 K ohms |
| " | R102 | 56 K ohms |
| " | R103 | 30 K ohms |
| " | R104 | 18 K ohms |
| " | R105 | 270 K ohms |
| capacitor C101 | | 0.22 uF. |
| " | C102, 102' | 5000 pF. |
| " | C104 | 0.33 uF. |
| " | C105 | 0.01 uF. |
| diodes D101, 102, 103 | | 1N4004 |
| zener diode D104 | | 40 V ± 5%, 1/2 W |
| Control circuit 20: | | |
| resistor R1 | | 250 K ohms |
| " | R2, R3 | 500 ohms |
| " | R4, R8 | 2400 ohms |
| " | R5, R9 | 240 ohms |
| " | R6, R10 | 5 K ohms |
| " | R7, R11 | 820 ohms |
| " | R12, R13 | 2500 ohms |
| " | R14 | 2 K ohms |

Control circuit 20 has been built and operated satisfactorily in both discrete circuit form and as a monolithic IC.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. In an emergency lighting system having a high reactance transformer with a primary winding adapted for coupling to an AC energy source and a secondary winding, circuit means for monitoring the AC source voltage comprising:

means for coupling the secondary winding of the transformer with a non-linear load during one half cycle of the AC source voltage; and means for coupling the transformer secondary winding with a linear load during an alternate half cycle of the AC source voltage to provide DC voltage proportional to the AC source voltage.

2. The circuit means of claim 1 wherein the transformer secondary winding is center-tapped.

3. The circuit means of claim 2 wherein the means for coupling with a non-linear load includes a diode connected serially with a battery between a first leg of the secondary winding and the center tap for charging the battery.

4. The circuit means of claim 2 wherein the means for coupling with a linear load includes a diode connected serially with a capacitance between a second leg of the secondary winding and the center-tap, and a resistance connected in shunt with the capacitance, the DC voltage proportional to the AC source voltage appearing across the resistance.

* * * * *